(12) United States Patent
Hofer et al.

(10) Patent No.: US 9,740,678 B2
(45) Date of Patent: Aug. 22, 2017

(54) METHOD AND SYSTEM OF AUTOMATIC SPEECH RECOGNITION WITH DYNAMIC VOCABULARIES

(71) Applicant: INTEL CORPORATION, Santa Clara, CA (US)

(72) Inventors: Joachim Hofer, Munich (DE); Georg Stemmer, Munich (DE); Josef Bauer, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/750,185

(22) Filed: Jun. 25, 2015

(65) Prior Publication Data

US 2016/0379629 A1 Dec. 29, 2016

(51) Int. Cl.
| | | |
|---|---|---|
| *G10L 17/00* | (2013.01) | |
| *G10L 17/06* | (2013.01) | |
| *G06F 17/27* | (2006.01) | |
| *G10L 15/19* | (2013.01) | |
| *G10L 15/08* | (2006.01) | |

(52) U.S. Cl.
CPC .......... *G06F 17/274* (2013.01); *G06F 17/277* (2013.01); *G06F 17/2775* (2013.01); *G10L 15/083* (2013.01); *G10L 15/19* (2013.01)

(58) Field of Classification Search
CPC ....... G10L 15/24; G10L 15/083; G10L 15/00; G10L 15/02; G10L 15/063; G10L 15/193; G10L 15/34; G10L 15/183; G10L 15/19; G10L 15/32; G10L 15/187; G06K 9/6885; G06K 9/6297; G06K 9/726

USPC ............. 704/1–10, 243–251, 254–256, 270, 704/230–231, 275

See application file for complete search history.

(56) References Cited

U.S. PATENT DOCUMENTS

| | | | |
|---|---|---|---|
| 6,473,734 B1 | 10/2002 | Dvorak | |
| 7,555,431 B2 | 6/2009 | Bennett | |
| 2008/0270136 A1 | 10/2008 | Deligne et al. | |
| 2014/0149119 A1* | 5/2014 | Sak ...................... | G06F 17/2775 704/260 |
| 2015/0269933 A1* | 9/2015 | Yu .......................... | G10L 15/16 704/232 |

OTHER PUBLICATIONS

Georges, et al., "Transducer-based Speech Recognition with Dynamic Language Models", Interspeech 2013, Aug. 25-29, 2013, Lyons, France, pp. 642-646.

Novak, et al., "Dynamic Grammars with Lookahead Composition for WFST-based Speech Recognition", Graduate School of Information and Science Technology, The University of Tokyo, Tokyo, Japan, 4 pages.

International Search Report and Written Opinion for International Patent Application No. PCT/US2016/034059, mailed Aug. 24, 2016.

(Continued)

*Primary Examiner* — Marivelisse Santiago Cordero
*Assistant Examiner* — Stephen Brinich
(74) *Attorney, Agent, or Firm* — Green, Howard & Mughal LLP.

(57) ABSTRACT

A system, article, and method of automatic speech recognition with dynamic vocabularies is described herein.

25 Claims, 9 Drawing Sheets

(56) References Cited

OTHER PUBLICATIONS

Oonishi, Tasuku et al., "Implementation and Evaluation of Fast On-the-fly WFST Composition Algorithms", Interspeech 2008, Sep. 22-26, 2008, retrieved online via: http://t2r2.star.titech.ac.jp/rrws/file/CTT100566452/ATD100000413/; pp. 2110-2113.

Shaik, M. Ali Basha et al., "Hierarchical Hybrid Language Models for Open Vocabulary Continuous Speech Recognition using WFST", SAPA-SCALE Conference 2012, retrieved online via http://www.sapaworkshops.org/2012/papers/sapa2012-139.pdf.

* cited by examiner

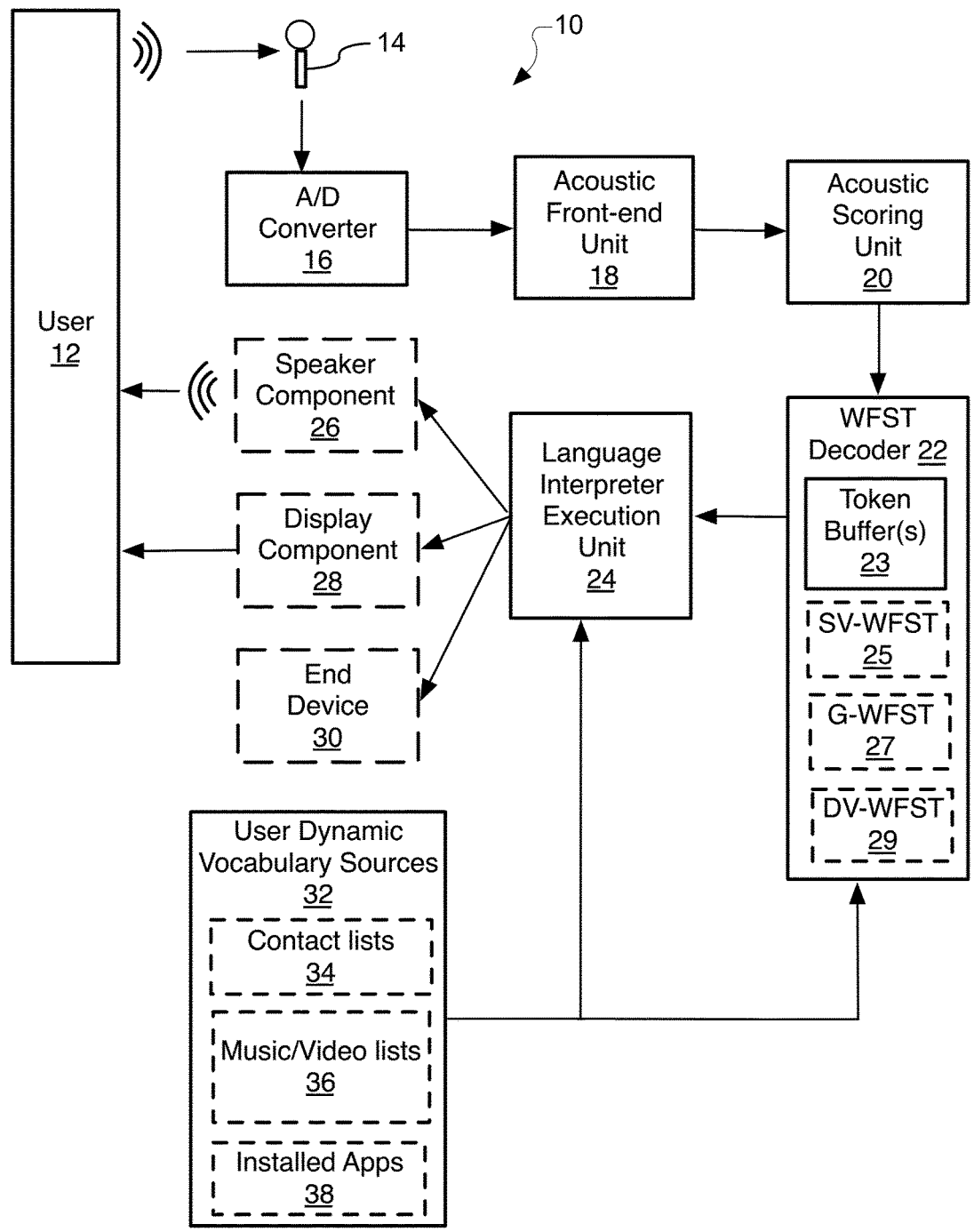

GENERATE A STATIC VOCABULARY WEIGHTED FINITE STATE TRANSDUCER (WFST) HAVING NODES CONNECTED BY ARCS TO PROPAGATE AT LEAST ONE TOKEN THROUGH THE STATIC VOCABULARY WFST AND AT LEAST ONE DYNAMIC VOCABULARY TRIGGER MARKER AT AT LEAST ONE OF THE ARCS
202

PROPAGATE A TOKEN THROUGH AT LEAST ONE DYNAMIC VOCABULARY WFST UPON THE AT LEAST ONE TOKEN REACHING THE TRIGGER MARKER
204

PROPAGATE A TOKEN THROUGH AT LEAST ONE GRAMMAR WFST HAVING AT LEAST ONE DYNAMIC VOCABULARY CLASS MARKER THAT INDICATES A TYPE OF DYNAMIC VOCABULARY AND IS ASSOCIATED WITH THE DYNAMIC VOCABULARY OF AT LEAST ONE OF THE DYNAMIC VOCABULARY WFSTS WITH A PROPAGATING TOKEN
206

PROVIDE A HYPOTHETICAL WORD OR PHRASE DEPENDING, AT LEAST IN PART, ON THE WFSTS AND COMPRISING TERMS IN THE STATIC VOCABULARY, DYNAMIC VOCABULARY, OR BOTH VOCABULARIES
208

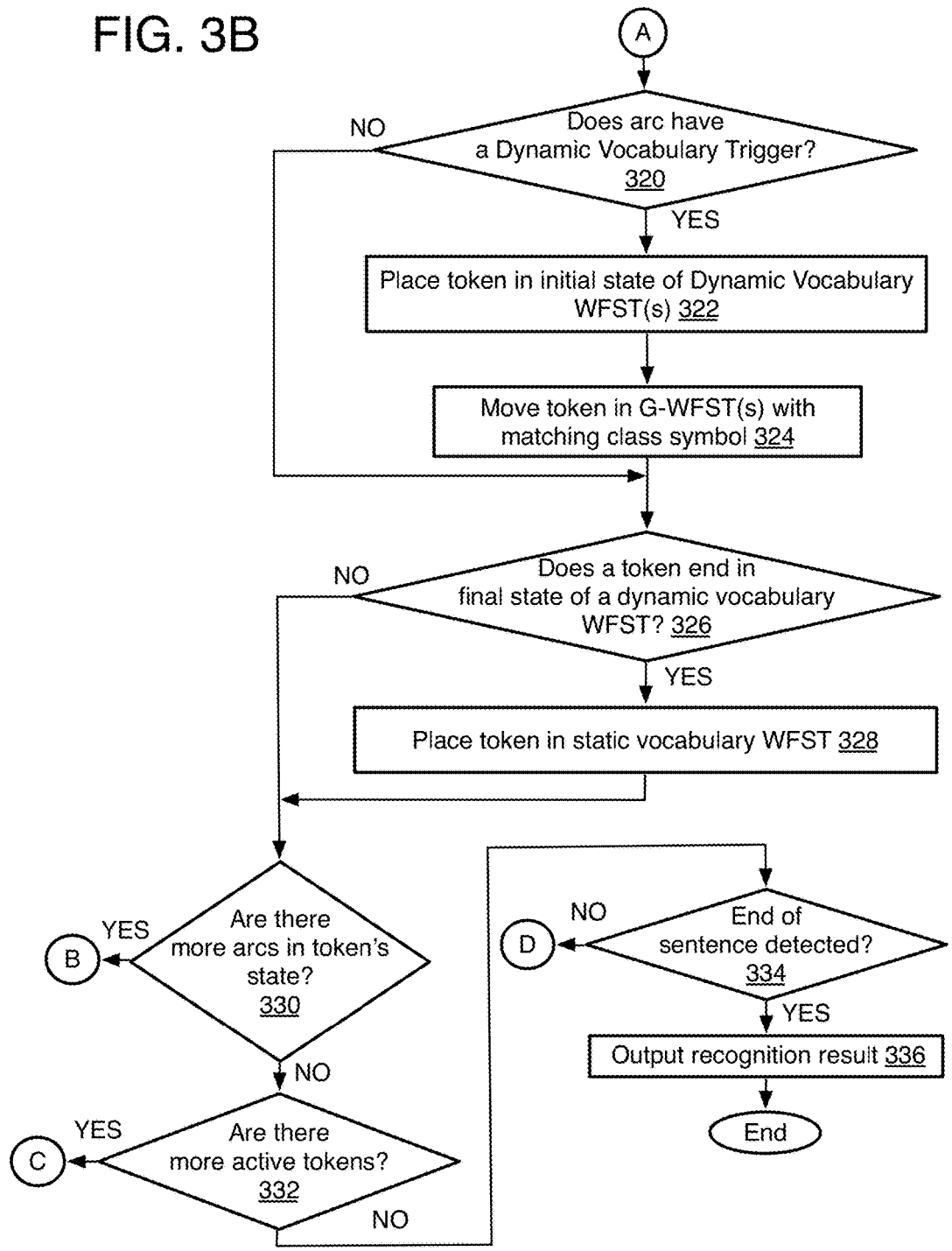

METHOD AND SYSTEM OF AUTOMATIC SPEECH RECOGNITION WITH DYNAMIC VOCABULARIES

BACKGROUND

Speech recognition systems, or automatic speech recognizers, have become increasingly important as more and more computer-based devices use speech recognition to receive commands from a user in order to perform some action as well as to convert speech into text for dictation applications or even hold conversations with a user where information is exchanged in one or both directions. Such systems may be speaker-dependent, where the system is trained by having the user repeat words, or speaker-independent where anyone may provide immediately recognized words. Some systems also may be configured to understand a fixed set of single word commands or short phrases, such as for operating a mobile phone that understands the terms "call" or "answer", or an exercise wrist-band that understands the word "start" to start a timer for example. Other systems may have an extensive vocabulary such as for voice activated search engines.

Thus, automatic speech recognition (ASR) is desirable for wearables, smartphones, and other small devices. Due to the computational complexity of ASR, however, many small devices with ASR systems, and especially those with large vocabularies, are server based such that the computations are performed remotely from the device which can result in a significant delay and/or significant battery usage due to communication via WI-FI or other wireless communication methods. Other ASR systems have on-board vocabularies and computation ability. In these cases, small audio devices such as wearables or smartphones often have very limited temporary memory capacity to hold the vocabularies used by a decoding transducer such as a weighted finite state transducer (WFST) by one example. Specifically, ASR on small devices, or even larger devices such as servers but with dedicated memories, is often restricted to a relatively limited standard vocabulary and grammar that is accessible or placed on all devices using a certain ASR application. Typically, the memory capacity is too small to add customized dynamic vocabularies and WFSTs to use those dynamic vocabularies that are unique to a specific device. Such desired dynamic vocabularies may be in the form of lists of names, phone numbers, email addresses, or other information from a contact list on a device, or music or video descriptions from media applications on the device, and so forth.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a schematic diagram showing an automatic speech recognition system;

FIG. 2 is a flow chart of a speech recognition process with dynamic vocabularies;

FIGS. 3A-3B is a detailed flow chart of a speech recognition process with dynamic vocabularies;

DETAILED DESCRIPTION

Figure 3A:
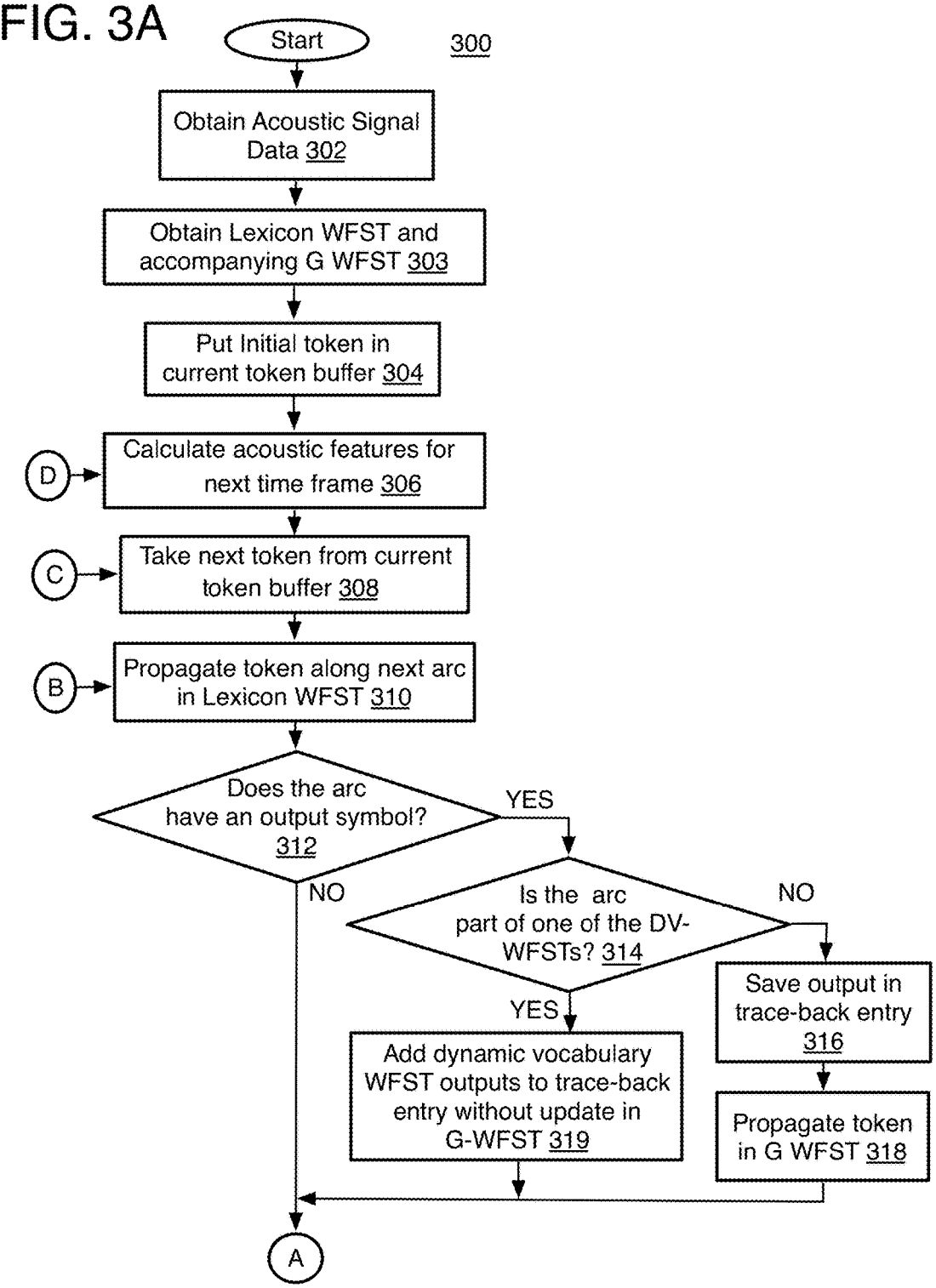

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptop or desktop computers, mobile devices such as smart phones or wearables such as a smart watch, smart glasses, or exercise band, video game panels or consoles, television set top boxes, on-board vehicle systems, dictation machines, security and environment control systems for buildings, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of automatic speech recognition with dynamic vocabularies.

Speech enabled human machine interfaces (HMI) record audio with a microphone, process the acoustic data with a computing device and then output speech or visual information to the user. The conventional systems use a static or standard vocabulary that is the same vocabulary accessible by, or loaded onto, multiple devices. It would be more efficient, however, to also include words in the automatic speech recognition (ASR) vocabulary that are unique to a certain user or a user's device so that the ASR applications immediately recognize such words added to a user's device. Such words may be in the form of word lists that include names, email addresses, phone numbers, or other information in a contact list or media descriptions such as titles of music, games, or video (such as movies), and so forth. By using this data, many applications of ASR may have a device-specific vocabulary, i.e. changing the vocabulary supported by the ASR engine on-the-fly to provide efficient user-specific or device-specific word recognition and responses. Such a device, however, may have limited memory, time, and power capacity for adding a device-specific vocabulary to the standard ASR vocabulary already used. Here, user-specific, or user-specific data, refers to any data on a device such as a smart phone or a wearable device and that may be unique to the device because it was placed on, or accessed on, the device due to the personal preference of one or more users of the device. Thus, the term device-specific may be used interchangeably with user-specific herein.

Existing solutions of user-specific vocabulary are mostly based on static composition weighted finite state transducer (WFST) decoders (e.g. M. Georges et al., *Transducer-based Speech Recognition with Dynamic Language Models*, Interspeech 2013). These approaches replace specifically marked arcs in the statically combined WFST with the user-specific grammar. Those approaches cannot be combined with dynamic composition, as modifications have to be applied to both, the lexicon and the grammar WFSTs. Static composition WFST decoding is not suitable for speech recognition on small devices as the statically composed WFST is usually several times larger than the plural WFSTs used in dynamic composition combined.

Some research has been performed on user-specific vocabulary with dynamic composition WFST decoders (see "Dynamic Grammars with Lookahead Composition for WFST-based Speech Recognition", J. R. Novak et al., Interspeech 2012). This approach, however, has the disadvantage that the memory overhead for the pre-built resources increases significantly. The lexicon WFST has to be augmented with all monophone outputs. As all the cross-word contexts are encoded into the lexicon WFST, all triphone contexts have to be added which results in a significant increase in size. By this approach, an 8,000 word vocabulary had to be increased in size from 2.4 MB to 7.2 MB, and a 106,000 word vocabulary from 6.2 MB to 31 MB. Additionally, the grammar WFST (G-WFST) cannot be stored as a pure acceptor in this approach as input and output symbols may differ, which also appears to increase the WFST size by approximately 25%. These disadvantages are especially important on devices with small footprints (smartphones, wearables, etc.).

To resolve these issues, the disclosed process solves the problem of combining a user-specific vocabulary (referred to herein as a dynamic vocabulary) with a pre-built (or static) vocabulary on a device with limited resources. This results in a minimal memory and computational overhead. More specifically, the disclosed approach allows dynamic extension of the ASR recognition vocabulary when a speech recognition engine is based on a dynamic composition finite state transducer (FST) decoding algorithm. Such a dynamic composition WFST decoder may implement ASR on devices with constrained RAM resources, e.g. smartphones, wearable devices or laptops, but also on servers where the amount of RAM that can be assigned to each active process is limited as well.

This is accomplished by using dynamic vocabulary (or, DV, user-specific, or just dynamic) WFSTs that are used in parallel with the static (or SV, user independent, built-in, pre-built, or simply static) WFST. Each DV-WFST represents a class of words corresponding to a class symbol in the G-WFST. The G-WFST may have several of those class symbols that do not match any user independent vocabulary but are represented by dynamic vocabularies. Examples for such classes include address book entries, song titles, common navigation destinations and so on. The corresponding DV-WFSTs are built specifically for the user and may also incorporate a grammar for the dynamic words. The SV-WFST has dynamic vocabulary trigger symbols, which usually represent word boundaries. Once a token reaches such a trigger symbol, a token is created in the start node of each DV-WFST. In order to incorporate the language model score of the dynamic vocabulary class, the token propagates along an arc corresponding to the dynamic vocabulary class in G when it is placed in the DV-WFST. The DV-WFSTs run in parallel with the SV-WFST and token propagation is performed accordingly. When tokens propagate along an arc with an output symbol, that output is recorded (e.g. by placing the output symbol in a trace back array or a word lattice), but the outputs in the DV-WFSTs are not matched with arcs in the G-WFST. That way, the G-WFST may be used in combination with dynamic vocabulary without requiring any user-specific modifications. Since the G-WFST is largely unmodified except with acceptor arcs for the class symbols and the SV-WFST only requires additional trigger symbols, there is merely a relatively small increase in data size that must be stored in memory.

Also upon a token reaching an end state of a DV-WFST, the token propagates back into the SV-WFST so that user independent words may be spoken after dynamic vocabulary words. As the SV-WFST only has cross-word context necessary to cover the user independent words, new cross-word context can be established upon a token entering or leaving a DV-WFST in order to improve recognition accuracy. Thus, the transition arcs between static and dynamic vocabulary terms is handled by providing multiple alternative arcs at the transitions, and by one example, one arc for each possible phonetic context. These approaches are explained in greater detail below.

Referring to FIG. 1, an automatic speech recognition system 10, such as a speech enabled human machine interface (HMI), may have an audio capture or receiving device 14, such as a microphone for example, to receive sound waves from a user 12, and that converts the waves into a raw electrical acoustical signal that may be recorded in a memory. The system 10 may have an analog/digital (A/D) converter 16 to provide a digital acoustic signal to an acoustic front-end unit 18. The acoustic front-end unit 18 may perform pre-processing which may include noise cancelling, pre-emphasis filtration to flatten the signal, and/or voice activation detection (VAD) to identify the endpoints of utterances as well as linear prediction, mel-cepstrum, and/or additives such as energy measures, and delta and acceleration coefficients, and other processing operations such as weight functions, feature vector stacking and transformations, dimensionality reduction and normalization. The front-end unit 18 also may divide the acoustic signal into frames, by 10 ms frames by one example, and extracts acoustic features or feature vectors from the acoustic signal using Fourier transforms and so forth. An acoustic scoring unit 20 then determines a probability score for the context-dependent phonemes that are to be identified.

A weighted finite state transducer (WFST) unit or decoder 22 uses the acoustic scores to identify one or more utterance hypotheses and compute their scores. Additionally, the WFST decoder 22 also may create a word lattice during decoding that provides confidence measures and/or alternative results. The WFST decoder 22 uses calculations that may be represented as a network of arcs and states that are referred to as WFSTs. The WFSTs may be deterministic or non-deterministic finite state transducers that may or may not have epsilon arcs. The WFSTs may have one or more final states that may or may not have individual weights, and the WFSTs may have one or more initial states. As explained below, the disclosed decoding process includes at least one WFST that is mainly (or initially) statically composed from a lexicon WFST (the SV-WFST), a DV-WFST, and a language model or a grammar G-WFST. The WFST decoder 22 simultaneously handles propagations of tokens through previously generated DV-WFSTs (29), a SV-WFST (25), and a G-WFST (27). This arrangement is used to implement dynamic vocabularies as explained below. Alternatively, the lexicon WFST may or may not be implemented as a tree without an incorporated grammar or language model. The lexicon WFST may be an L-WFST, a context-sensitivity lexicon WFST (CL-WFST), hidden Markov model (HMM) CL-WFST (or HCL-WFST) that may have HMM transitions, HMM state IDs, Gaussian Markov Model (GMM) densities or deep neural network (DNN) output state IDs as input symbols. The WFST may or may not be determinized, minimized, weight or label pushed or otherwise transformed (e. g. by sorting the arcs by weight, input or output symbol) in any order before being used for decoding.

This lexicon WFST may include many forms or names herein such as pre-built, built-in, static vocabulary (where static refers to mainly, or initially, built from a base, non-varying, or standard vocabulary that may be used for multiple devices), base vocabulary, and SV-WFST. The lexicon WFST is referred to as the SV-WFST even though some number of the arcs in the WFST may have a dynamic vocabulary trigger marker rather than the static vocabulary as explained herein. The WFST decoder 22 also may initiate one or more DV-WFSTs upon certain triggers being activated on the SV-WFST. The DV-WFST may be in the same or different form (L/CL/HCL) as the lexicon WFST. The WFST decoder 22 uses known specific rules, construction, operation, and properties for single-best or n-best speech decoding, and the details of these that are not relevant here are not explained further in order to provide a clear description of the arrangement of the new features described herein.

The dynamic vocabulary, as explained herein, may be user-specific or device-specific, and may be formed from a variety of user dynamic vocabulary sources 32 on the device or at least accessible by the device, and being used by a user of the device, and considered part of the system 10. Some examples of the sources of the dynamic vocabularies include from a contact list(s) 34, music or video lists 36, and/or lists of data from other applications 38 that may be on a user device (such as data relating to games, geographical locations, entertainment or dining lists, search engine keywords, or application names, to name a few examples).

The decoding result are made available to a language interpreter and execution unit (or interpretation engine) 24 to determine the user intent. This intent determination or spoken utterance classification may be based on decision trees, form filling algorithms, or statistical classification (e. g. using support-vector networks (SVNs) or deep neural networks (DNNs)).

Once the user intent is determined for an utterance, the interpretation engine 24 also may output a response or initiate an action. The response may be in audio form through a speaker component 26, or in visual form as text on a display component 28 for example. Otherwise, an action may be initiated to control another end device 30 (whether or not considered as part of, or within, the same device as the speech recognition system 10). For example, a user may state "call home" to activate a phone call on a telephonic device, the user may start a vehicle by stating words into a vehicle fob, or a voice mode on a smart phone may perform certain tasks on the smart phone. The end device 30 may simply be software instead of a physical device or hardware or any combination thereof, and is not particularly limited to anything except to have the ability to understand a command or request resulting from a speech recognition determination and to perform or initiate an action in light of that command or request.

Referring to FIG. 2, an example process 200 for a computer-implemented method of speech recognition is provided. In the illustrated implementation, process 200 may include one or more operations, functions or actions as illustrated by one or more of operations 202 to 208 numbered evenly. By way of non-limiting example, process 200 may be described herein with reference to example speech recognition devices described herein with any of FIGS. 1, 4-11, and where relevant.

Process 200 may include "generate a static vocabulary weighted finite state transducer (WFST) having nodes connected by arcs to propagate at least one token through the static vocabulary WFST and at least one dynamic vocabulary trigger marker at at least one of the arcs" 202. In other words, this operation is directed to the building of a lexicon and static vocabulary WFST (the SV-WFST) and merely a dynamic vocabulary trigger marker on the arcs that represent a location at which a dynamic vocabulary may be initiated, e.g. a word boundary. The actual words or phoneme of the dynamic vocabulary are not inserted into the SV-WFST. By one form, only those dynamic vocabulary trigger markers positioned at word boundary arcs will trigger a DV-WFST as explained below.

Process 200 also may include "propagate a token through at least one dynamic vocabulary WFST upon the at least one token reaching the trigger marker" 204. Particularly, when a token is propagated along the arc of the dynamic vocabulary trigger marker of the SV-WFST, a new token may be formed at the initial state of multiple DV-WFSTs, and by one form each DV-WFST of a different class, where the class is a type of data forming the dynamic vocabularies. The class may be a name list from a contact database, music title list, and/or many other classes as described below.

Process 200 also may include "propagate a token through at least one grammar WFST having at least one dynamic vocabulary class marker that indicates a type of dynamic vocabulary and is associated with the dynamic vocabulary of at least one of the DV-WFSTs with a propagating token" 206. Also as explained in detail below, instead of matching the output symbols of the DV-WFSTs in G, the usage of a specific DV-WFST itself is matched with a dynamic vocabulary class marker in the G-WFST. Thus, one main idea of the present approach may be stated as using word boundary symbols in the SV-WFST (which may be a context-sensitive lexicon (CL) WFST) to trigger dynamic vocabularies, and user-specific vocabulary class symbols in the G-WFST to adjust the scores of words from a dynamic vocabulary and to determine the grammar or language model context.

As explained below, this process 200 also may include omitting the use of the outputs of the DV-WFSTs to propagate tokens in the G-WFST while still using them as outputs (e.g. by placing them in a trace back entry, a word lattice or by some other means). Additionally, process 200 may use a technique for phonetic cross word context modeling between static and dynamic words explained below that uses multiple alternative arcs where each arc represents a different phonetic context, and in one form, one alternative arc is provided for each possible context.

Process 200 also may include "provide a hypothetical word or phrase depending, at least in part, on the WFSTs and comprising terms in the static vocabulary, dynamic vocabulary, or both vocabularies" 208. This refers to the hypothetical word or phrase determined by using the lexicon SV- and DV-WFSTs with the combined vocabularies. The hypothetical phrase may be considered the output of the WFST decoder and the input to the language interpreter execution unit for further analysis. It is possible that no user or device specific vocabulary exists during speech recognition. In that case, the invention can still be used with empty DV-WFSTs resulting in hypotheses that only has static vocabulary words.

Referring to FIGS. 3A-3B, an example computer-implemented process 300 for automatic speech recognition with dynamic vocabularies is provided. In the illustrated implementation, process 300 may include one or more operations, functions or actions as illustrated by one or more of operations 302 to 336 numbered evenly. By way of non-limiting example, process 300 may be described herein with reference to example speech recognition devices described herein with any of FIGS. 1, 4-11, and where relevant.

Process 300 may include obtaining 302 acoustic signal data. As mentioned above, this may include the use of a sound or audio capture device, pre-processing of the acoustic signal, feature extraction by a front-end unit, and acoustic scoring by an acoustic scoring unit. By one approach, the feature extraction and acoustic scoring occurs before the WFST decoding begins. By another example, the acoustic scoring may occur just in time. If scoring is performed just in time, it may be performed on demand, i.e. only scores that are needed during WFST decoding are computed.

Figure 4:
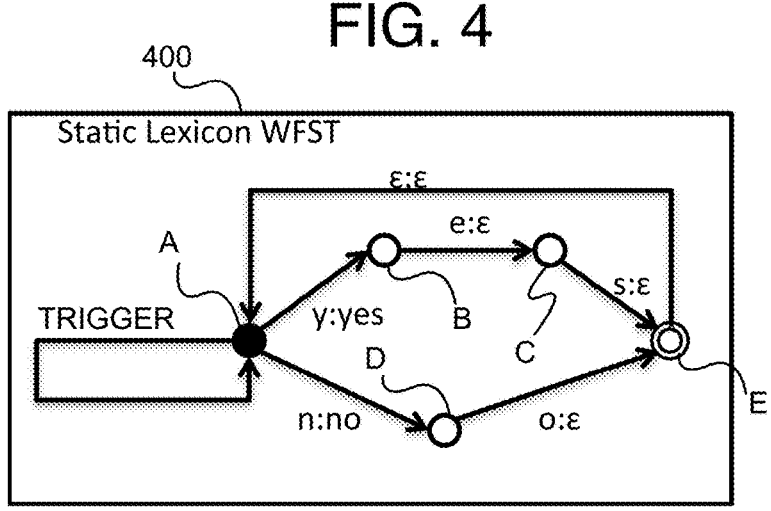
FIG. 4 is a schematic diagram of an example pre-built static vocabulary weighted finite state transducer (WFST) with a marker to trigger one or more dynamic vocabulary WFSTs.

Referring to FIG. 4, process 300 may continue with "obtain lexicon WFST and accompanying G-WFST" 303. In order to assist with explaining process 300, a speech decoding static vocabulary lexicon WFST 400 (SV-WFST) is provided and is used to generate a hypothetical word or phrase for the decoding of the audio data. The SV-WFST 400 is shown here with states A to E connected by arcs or edges (the arrows) between the states and extending from an initial state to a final state. On the arcs, both the input and output labels or symbols are shown unless the label is epsilon which refers to no label. Weights are omitted to simplify the figure. The arcs are referred to herein by the letter of the source state and destination state of the arc (for example arc AB extends from state A to state B). The explanation of other features of the graphs are explained along with the description of process 300. A key is provided that applies to all of FIGS. 4-8.

The lexicon WFST refers generally to any lexicon-based WFST that may have arcs that are used to build one or more word portions, whole words, or phrases over a number of arcs. The lexicon WFST may be an L-WFST, CL-WFST, HCL-WFST or other lexicon-based WFST. These lexicon WFSTs may be SV-WFSTs downloaded as a non-modifiable (at least at the device) resource together with the speech recognition application units, and may be standard WFSTs that are downloaded to multiple devices.

For this approach, the SV-WFST may be augmented with arcs that represent word boundaries. Those arcs can e.g. be modeled by using an input symbol that does not represent an acoustic input (these are HMMs or states, depending on the type of WFST decoder). By one form, the acoustic inputs are represented by positive integers whereas the trigger marker is a negative value (here represented by the word "TRIGGER" on SV-WFST 400). Other alternatives for the marker include any number or symbol that does not represent any original input symbol of the SV-WFST. The arcs may represent word boundaries to be able to allow dynamic vocabulary words to be generated between two static vocabulary words, but not within a word. When a token reaches one of the triggers, a token will be placed at the initial state of multiple, or each, DV-WFST each of a different class, and in one form, no matter how many DV-WFSTs exist. By another form, only certain DV-WFSTs of certain classes may be triggered. The dynamic vocabulary trigger markers may be placed on any arc on the SV-WFST, whether at an initial state, final state, or in between. These trigger markers may be independent of the contents of the DV-WFSTs, and may be inserted into the SV-WFST when the SV-WFSTs are built, and before the DV-WFSTs are built.

To begin propagating a token through the SV-WFST 400, process 300 may include putting 304 an initial token in a current token buffer. In one form, the token will be placed in the initial state of the WFST which corresponds to state A in the example of SV-WFST 400. A token buffer, such as buffer 23 (FIG. 1) or 926 (FIG. 9), may hold the tokens for the frames to be analyzed. Thus, there may be multiple token buffers such as one buffer for each frame. By one approach, this includes at least two token buffers including a current token buffer holding active tokens of the current frame, and a next token buffer holding the tokens of the next frame to be activated. In a different approach, there may be only one token buffer which may be organized as a ring that holds both tokens for the current and the next frame. This buffer may include a marker that separates current tokens from future tokens.

The process 300 may include calculate 306 acoustic features for the next time frame. Thus, one or more possible extracted features are determined, and in the present example, based on WFST operations, it is determined that there are three different destination states (B and D and a repeating arc that loops back to A). The token at state A is then taken 308 from the token buffer, and propagated 310 through each arc, and in this case, the arcs AA, AB and AD, using acoustic scores. Thus, it may be said that the token simultaneously propagates along three or more different possible pathways or sequences (depending on the number of self-loops AA that are performed) and from the utterance start state which results in three or more created tokens that are placed in the token buffer for the next frame. The tokens may then be propagated along arcs BC, DE, and repeated along backward repeating arc EA, until a final token reaches the end state E.

More specifically, the input labels of an arc may be the possibly context dependent phoneme, HMM, GMM density, DNN state or other acoustic ID, depending on the type of WFST used for decoding. The inputs are used to determine the acoustic score applied to a token that is propagated along the arc. The output labels of the arcs represent spoken words or other sentence fragments. If an output label of an arc is not epsilon (empty), and a token is passed along said arc, then the corresponding word or sentence fragment is appended to the utterance hypothesis of the token, which may be achieved by placing it in a trace back entry or in a word lattice. Thus, for example, the output of arc AB is the word "yes" meaning that if a token is passed along arc AB, then the underlying utterance hypothesis has the word "yes".

Thus, for the process 300, the next operation may be to determine "does the arc have an output symbol?" 312. If no and epsilon is shown for example, process 300 may continue to check 320 whether the arc has a dynamic vocabulary trigger marker. If an output symbol exists, as in the case of self-loop arc AA, AB, or AD, process 300 then may perform a test that includes asking "is the arc a part of one of the DV-WFSTs?" 314. If not, the output word is part of the static vocabulary, and process 300 may continue as a usual SV-WFST and include "save output in trace-back entry" 316 as mentioned above, and "propagate token in G-WFST" 318 so that the G-WFST is propagating in parallel to the SV-WFST. A G-WFST is an acceptor with words as input and output symbols and provides probabilities for the words in light of the context of other words in a phrase or sentence. The G-WFST also may be an initially pre-built, non-modifiable WFST and tokens are propagated in it in parallel with the lexicon WFST. There is only one G-WFST, and it comprises both words from the static vocabulary and dynamic word classes each of which represents one of the DV-WFSTs.

Output symbols in the dynamic vocabulary are treated differently from output symbols in the base (static) vocabulary. By one form then, when it is determined that the arc is part of one of the DV-WFSTs (314), the process 300 may include "add dynamic vocabulary WFST outputs to trace-back entry without update in G-WFST" 319. Thus, the created words are appended to the recognizer output, but they are not composed with the G-WFST, as the words themselves have no representation in G-WFST. Instead, as mentioned below, the class symbol representing the dynamic vocabulary is matched with the G-WFST once a token is created in an initial node of a DV-WFST.

Process 300 may include "does arc have a dynamic vocabulary trigger marker" 320. If there is none, process 300 continues with operation 326 to check whether the token is propagated into a final state of a DV-WFST. If a trigger marker exists, process 300 then may include "place token in initial state of dynamic vocabulary WFST(s)" 322 so that whenever a token in the SV-WFST reaches a dynamic vocabulary trigger marker, a token is created in the initial node of each DV-WFST(s).

As mentioned above, if the speech recognition engine uses a limited built-in vocabulary (for example due to memory restrictions), then it is necessary to augment its vocabulary by user-specific words that are required to understand user-specific data. These additional words are often called dynamic vocabulary. The words have to be incorporated into the existing grammar or statistical language model so that they can be sensibly incorporated into sentences using the base vocabulary. The present approach for dynamic vocabulary is targeted to devices with limited memory resources. In order to reduce memory overhead, a WFST decoder with dynamic composition (where the lexicon and grammar WFSTs are composed dynamically during recognition) is used to minimize memory requirements. For dynamic composition, three types of WFSTs are used, the SV-WFST (such as a CL WFST) that represents the lexicon and a G-WFST that represents the grammar, while a third type is a dynamic vocabulary lexicon WFST (DV-WFST) and is provided to propagate tokens separately from the tokens on the SV-WFST. The dynamic vocabulary WFSTs may have the same structure as the SV-WFST (i.e. if the SV-WFST is a CL WFST, the DV-WFSTs may also be a CL WFSTs). Thus, the SV-WFST and the DV-WFSTs may share the same input symbols. The output symbols of the SV-WFST are static vocabulary words, whereas the output symbols of the DV-WFSTs are dynamic vocabulary words and may thus differ. The G-WFST may not have the label symbols for the dynamic vocabulary but instead dynamic class symbols that represent a DV-WFST as a whole.

By one alternative form, however, the dynamic vocabulary is represented by a statically composed CLG-WFST, i.e. it has a grammar incorporated. Using this technique, it is not only possible to include single words as a dynamic vocabulary but also short phrases or simple grammars. As a dynamic vocabulary is usually used for word lists or very simple word constructs (e.g. first name, optional middle initial, last name), the use of a static composition here is no worse than using a dynamic composition. In this case, a whole phrase of the DV-WFST is matched with one dynamic class symbol of the G-WFST as described below.

Figure 5:
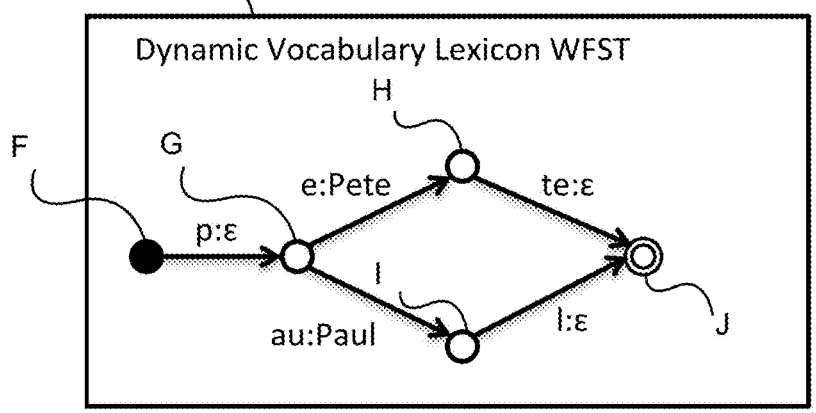
FIG. 5 is a schematic diagram of an example dynamic vocabulary lexicon weighted finite state transducer.
Figure 9:
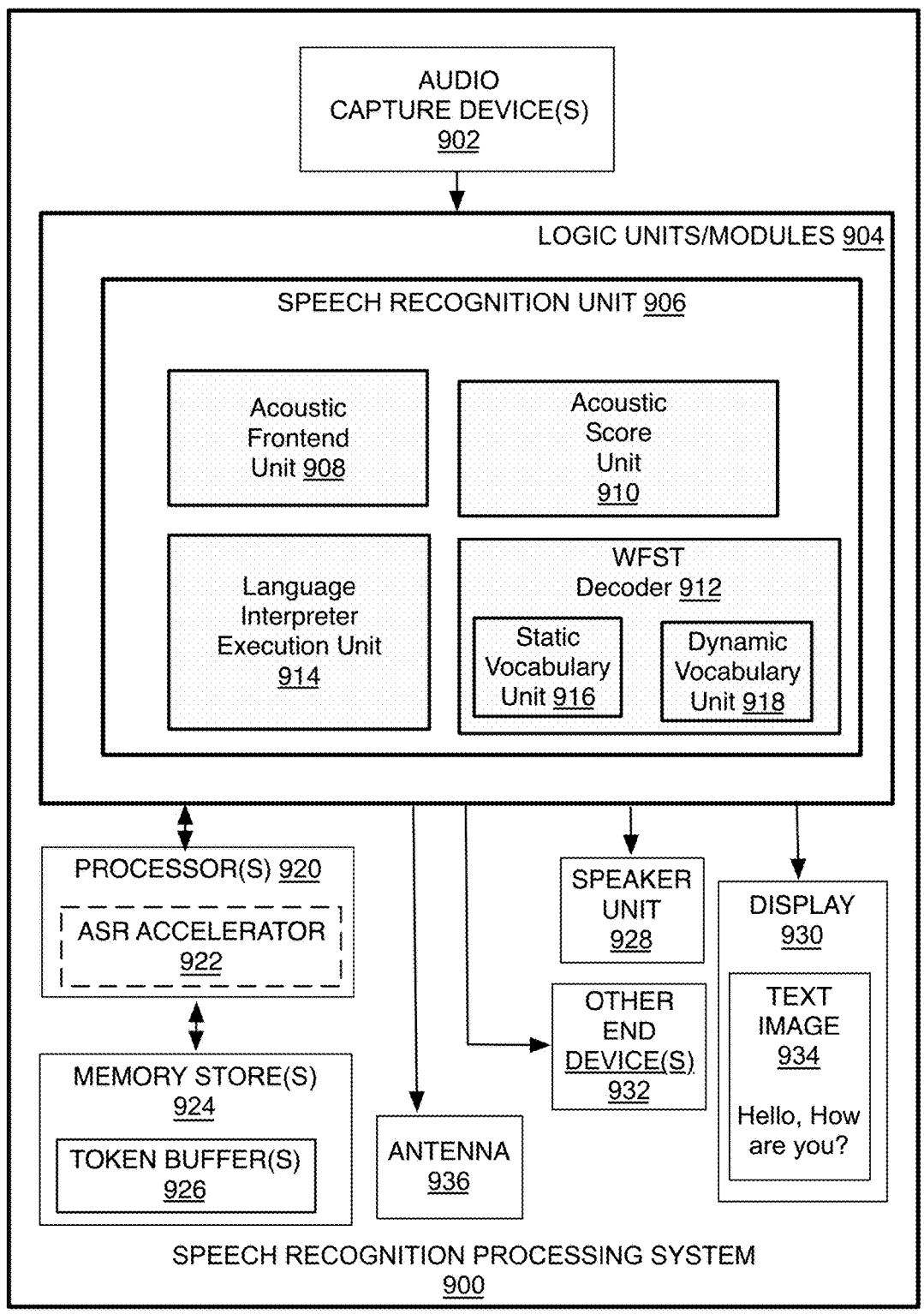
FIG. 9 is an illustrative diagram of an example system.

Referring to FIG. 5 an example dynamic vocabulary lexicon WFST (DV-WFST) 500 is shown with nodes F to J forming arcs FG, GH, GI, HJ, and IJ, and with output words Pete or Paul at arcs GH and GI respectively. The DV-WFSTs may be built by a separate unit, such as unit 29 (FIG. 1) or 918 (FIG. 9). The DV-WFSTs may be created and stored on disk, flash drive, or other memory by the dynamic vocabulary unit. The input to the dynamic vocabulary unit is a list of words, a list of phrases, and/or a grammar. The input may also have phonetic transcriptions of the words or the unit may use grapheme-to-phoneme (G2P) conversion in order to create the phonetic transcriptions automatically.

The input lists for the dynamic vocabulary may each be considered a class or type of dynamic vocabulary. The dynamic vocabulary classes may include data from a contact list(s) such a list of names, email addresses, phone numbers, and so forth where each list forms a class. Other classes may include lists that describe music or video (including movies) such as a list of titles, artist, or directors. Other data forming the lists may be data from other applications that may be on a user device (such as data relating to games, geographical locations, entertainment or dining lists, search engine keywords, or application names, to name a few examples).

The decoder or dynamic vocabulary unit creates the DV-WFST(s) using those inputs and stores them. This may be performed at regular intervals (e.g. at night, when the device is charging) or whenever the underlying database changes (e.g. a new contact is added to the list of contacts in the phone). During speech recognition, the DV-WFST is read as a static resource for one implementation of the process 300. Which classes are to be included in the dynamic vocabulary is mainly automatically set by the device manufacturer or ASR application provider, but it will be understood that a user may be provided the option to select which classes to include in the dynamic vocabulary.

As another approach, it is possible to use the applications to limit the size of the dynamic vocabulary by using dynamic vocabulary classes that relate to sub-sets of other classes for inclusion in the dynamic vocabulary such that the classes are chosen based on the current recognition run. By example, for European-style address entry where the street name is spoken after the city name, in that scenario when a hypothesized city name was recognized during decoding, the street names of that city are loaded as a dynamic vocabulary, and in turn as a class for a DV-WFST. Street names of cities that were not yet detected during recognition are not loaded to save memory. This approach may have significant advantages in latency relative to state-of-the art approaches which usually need two or more recognition passes for one utterance where the second pass can only start once the utterance was completely spoken.

Regardless of when the dynamic vocabulary classes are chosen, in order to build a DV-WFST, it may be presented with the complete vocabulary at one time. So if, for example, there is a new entry in the contact list, the whole DV-WFST is built for that class. The contents of the remainder of the underlying database does not matter for the conversion of a single DV-WFST.

Each DV-WFST outputs (as output labels along the arcs of the WFST) two different types of symbols: One represents the words that were recognized and that are stored in the decoding result (trace-back entry, word lattice or similar). The other one is a dynamic vocabulary symbol that is matched with the corresponding dynamic vocabulary class symbol in a G-WFST. This output is generated whenever a DV-WFST is invoked. That way, the correct language model score of a phrase that has dynamic vocabulary (or user-specific) words can be determined.

Process 300 may include "place token in initial state of dynamic vocabulary WFST(s)" 322. After a dynamic vocabulary trigger marker is detected, a token is placed in the initial state of each DV-WFST. Thus, dynamic vocabulary words can be formed whenever a dynamic vocabulary trigger marker is encountered in the SV-WFST. As those markers are usually placed at word boundaries, dynamic vocabulary words can be spoken between static vocabulary words. The newly created token is stored in the token buffer in order to be propagated in the next decoding frame.

Specifically, process 300 then may include "move token in G-WFST(s) with matching class symbol" 324. By one form, whenever a token is placed at an initial state of a DV-WFST, the arc in the G-WFST with the matching dynamic vocabulary class symbol is found for that dynamic vocabulary and the token is propagated along the matching arc. This may be the only instance when token propagation inside a DV-WFST causes a corresponding propagation of the token inside G-WFST. When output symbols are created in a DV-WFST they are not matched with the G-WFST as described above.

The G-WFST is an acceptor that determines how sentences can be built from words and how probable each sentence is. In order to enable a dynamic vocabulary, additionally to word symbols, each G-WFST has a class symbol that represents a dynamic vocabulary. An example of a sentence for such a WFST would be "please call CONTACT_NAME at home". In this example, CONTACT_NAME is a class symbol that represents the names of all the user's contacts. Thus, an arc in the G-WFST with this contact name class symbol would be matched to the DV-WFST of contact names when the contact name DV-WFST receives a token at its initial state, by one example.

Figure 6:
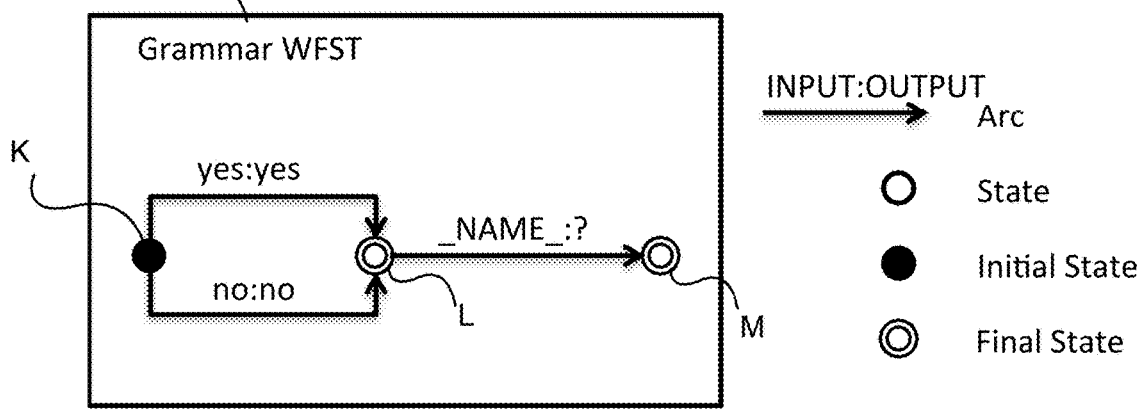
FIG. 6 is a schematic diagram of an example grammar weighted finite state transducer.

Referring to FIG. 6, another example matching G-WFST is provided with nodes K to M and two alternatives for arc KL, and one arc LM. For this example, the dynamic vocabulary class symbol is _NAME_. As the G-WFST is usually stored as an acceptor, _NAME_ is also the output symbol, yet instead of creating the output _NAME_, the words that were generated in the DV-WFST corresponding to _NAME_ form the output. It is not necessary to distinguish class symbols from regular word symbols in the G-WFST. The property of the class symbols is that those symbols do not appear as output labels in the SV-WFST, as they are not part of the base vocabulary.

The G-WFST that comprises the class symbols may be pre-built, and class symbols are put into the G-WFST based on grammar or the statistical language model that the G-WFST is built from. The score of the token on the DV-WFST is updated by the weight of the arc in the G-WFST with a dynamic vocabulary class symbol that corresponds to the respective dynamic vocabulary of the DV-WFST whenever a token inside a DV-WFST is created.

Process 300 may include "does token end in final state of a dynamic vocabulary WFST?" 326. If a token reaches the end state of a DV-WFST, the dynamic word or phrase is finished, and recognition continues using the SV-WFST. Thus, when a token reaches an end state, process 300 may include "place token in static vocabulary WFST" 328. The token may either be placed in the initial state of the SV-WFST or a special state of the SV-WFST that is used specifically for this case and that incorporates adjustments to cross-word phonetic context as explained below. The newly created token is stored in the token buffer in order to be propagated further in the next decoding frame.

In order to operate the SV- and DV-WFSTs as context sensitive lexicon WFSTs, alternative transition arcs are provided for the cross-word context. Specifically, many ASR decoders use context dependent phonemes with cross word context. That is, the beginning of a word is acoustically modelled differently depending on the word that was spoken previously. Accordingly, the end of a word is modeled differently based on the word that is spoken next. In the present approach to dynamic vocabulary, modeling cross-word context between static vocabulary words cannot simply be applied between dynamic and static vocabulary words because the previous or next word context for dynamic vocabulary words is lost since tokens that move between different WFSTs are placed in the same destination state independent of their word context. Using different states for each possible cross word context is not suitable on devices with small memory footprint as the number of required states would rise significantly similar to "Dynamic Grammars with Lookahead Composition for WFST-based Speech Recognition", J. R. Novak et al., Interspeech 2012. Thus, a problem arises when static vocabulary words and dynamic vocabulary words follow each other as the word context information is lost.

One possible way to avoid problems with cross word modeling is to assume that there is always a pause between static vocabulary words and dynamic vocabulary words. Thus, only silence is used as the context for the end of the first word and the start of the second word along the token path. This, however, can result in a significant degradation of recognition accuracy because a pause does not always occur between words. Instead, the present approach accounts for any possible cross word model for the transition.

Specifically, as an example, if the two words "call" and "john" were spoken one after the other, in the static vocabulary this would be modelled acoustically as "call_j" and "l_john". This means that the model for "call" is used that assumes that the next word starts with a "j", and the model for "john" assumes that the previous word ended on "l". Since this context information is lost due to the present approach to dynamic vocabulary, any context may be used, i.e. "call_a", "call_b", "call_c", . . . and equivalently "a_john", "b_john", . . . . It should be noted that the cross-word context is usually based on the phoneme of the previous or next word and not on the actual letter. Letters are only used here to simplify the explanation. In a real application, the cross-word context may be modelled by phonemes (or other acoustic units), silence or noise markers and not by letters.

Figure 7:
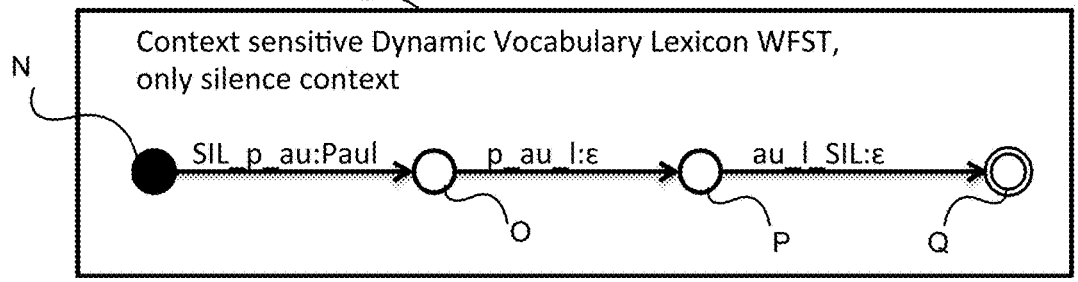
FIG. 7 is a schematic diagram of an example lexicon weighted finite state transducer with both static and dynamic vocabulary symbols.
Figure 8:
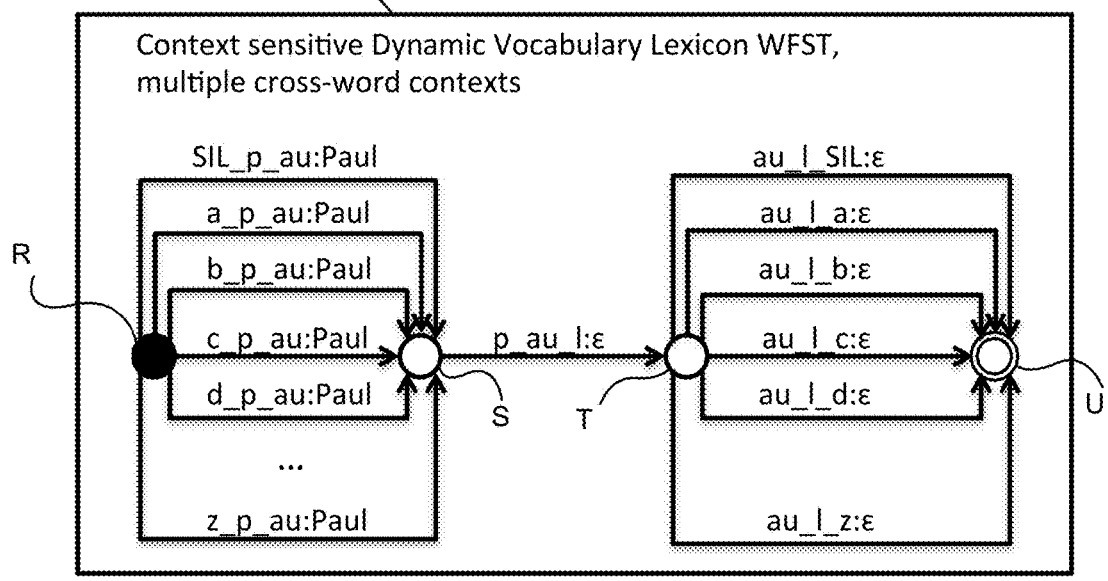
FIG. 8 is a schematic diagram of another lexicon weighted finite state transducer with both static and dynamic vocabulary symbols.

Referring to FIGS. 7-8, this may be modeled by placing several arcs in both the static SV-WFST and the dynamic DV-WFST for the transition from the static vocabulary to the dynamic vocabulary (or vice versa), each of them representing a different acoustic context. For example, and to compare to the present approach, a portion of a DV-WFST 700 is shown with nodes N to Q, and arcs NO, OP, and PQ, where N is the start node, and silence (SIL) is assumed as the acoustic context previous to the dynamic vocabulary word Paul. Silence is also assumed before the final node of the DV-WFST. In contrast, the DV-WFST 800 has alternative arcs for multiple, or each, possible acoustic context (a to z) including an arc (Sil) for the silence option. DV-WFST 800 has nodes R to U where alternative arcs are provided for each of arc RS and TU. The RS arc has the alternative acoustic contexts for the previous word (Sil_p_au:Paul, a_p_au:Paul, b_p_au:Paul, . . . z_p_au:Paul), while arc TU has alternative acoustic contexts for the next word (au_l_SIL:$\epsilon$, au_l_a:$\epsilon$, au_l_b:$\epsilon$, . . . au_l_z:$\epsilon$). While this present approach for transitions may not be better than using the correct cross word context, it is still significantly better than using only the silence context. It shall be noted again that letters are only used to simplify the explanation whereas phonemes or similar units would be used in a real application.

Then the process 300 checks for more arcs 330. In the present example, the process 300 loops so that the token propagates over the next arc (310), and the analysis for dynamic vocabulary is repeated. When there are no more arcs to analyze for the current active token, process 300 checks 332 to determine whether there are more tokens in the current token buffer. If so, the process 300 loops to take 308 the next token from the current token buffer, and the process 300 proceeds as mentioned before. Once the token buffer is empty for the current frame 332, the process 300 swaps the current token buffer for the next frame token buffer. If the end of the utterance is not reached 334, the process 300 loops back to repeat the token passing for the next frame, which becomes the current frame, and calculates 306 acoustic features again. The process repeats for each frame until either the audio input is completely processed or the end of the utterance was detected. End of utterance detection may be performed by voice activity detection (VAD), stable times of utterance hypotheses, timeouts, or any other methods that are suitable to determine if a speaker has finished talking.

Once the end of the utterance is detected 338, the process 300 then may include "output best utterance hypothesis" 336, and particularly to the interpretation engine to determine the user intent based on the output of the decoding phase.

Tests with the present implementations showed that the method disclosed herein to incorporate dynamic vocabularies introduces practically no additional memory or computational overhead, and only a very small degradation of recognition performance. Using the present approach, a 200,000 word vocabulary was enlarged from 9.2 MB to 9.4 MB (about 2%) to enable user-specific vocabularies. The matching G-WFST can be stored without modifications, as the user-specific vocabulary class is simply an acceptor arc with the respective class label. Thus, the present approach has very little additional memory overhead.

Runtime tests of the present approach were performed using a 200,000 words statistical language model on a personal assistant task (850 utterances). The present approach seems to have no noticeable impact on decoding speed, and in the tests, the speed even slightly improved from 1.58 trillion cycles to 1.51 trillion cycles. The recognition accuracy only slightly degraded from a word error rate of 14.8% to 15.0%. These results show that the present approach appears to have no noticeable negative effects on the recognition performance.

It will be appreciated that processes 200, and/or 300 may be provided by sample ASR systems 10, 1000, 1100, and/or 1200 to operate at least some implementations of the present disclosure. This includes operation of an acoustic front-end unit 1008, acoustic scoring unit 1010, WFST decoder 1012, and language interpreter execution unit 1014, as well as others, in speech recognition processing system 1000 (FIG. 10) and similarly for system 10 (FIG. 1).

In addition, any one or more of the operations of FIGS. 2-3 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Referring to FIG. 9, an example speech recognition processing system 900 is arranged in accordance with at least some implementations of the present disclosure. In various implementations, the example speech recognition processing system 900 may have an audio capture device(s) 902 to form or receive acoustical signal data. This can be implemented in various ways. Thus, in one form, the speech recognition processing system 900 may be an audio capture device such as a microphone, and audio capture device 902, in this case, may be the microphone hardware and sensor software, module, or component. In other examples, speech recognition processing system 900 may have an audio capture device 902 that includes or may be a microphone, and logic modules 904 may communicate remotely with, or otherwise may be communicatively coupled to, the audio capture device 902 for further processing of the acoustic data.

In either case, such technology may include a telephone, a smart phone, a dictation machine, other sound recording machine, a mobile device or an on-board device, wearables such as a smart watch, smart glasses, or exercise band, or any combination of these. Thus, in one form, audio capture device 902 may include audio capture hardware including one or more sensors as well as actuator controls. These controls may be part of a sensor module or component for operating the sensor. The sensor component may be part of the audio capture device 902, or may be part of the logical modules 904 or both. Such sensor component can be used to convert sound waves into an electrical acoustic signal. The audio capture device 902 also may have an A/D converter, other filters, and so forth to provide a digital signal for speech recognition processing.

In the illustrated example, the logic modules 904 may include an acoustic front-end unit 908 that provides pre-processing as described with unit 18 (FIG. 1) and that identifies acoustic features, an acoustic score unit 910 that provides acoustic scores for the acoustic features, a WFST decoder 912 that handles both static and dynamic vocabularies to provide hypothetical word sequences as described herein, and a language interpreter execution unit 914 that determines the user intent based on the output of the WFST decoder. The WFST decoder 912 may use DV-WFSTs, an SV-WFST and a G-WFST. The WFST decoder unit 912 may be operated by, or even entirely or partially located at, processor(s) 920, and which may include, or connect to, an accelerator 922 to perform at least the WFST decoding with dynamic vocabularies or acoustic scoring or both. The logic modules may be communicatively coupled to the components of the audio capture device 902 in order to receive raw acoustic data. The logic modules 904 may or may not be considered to be part of the audio capture device.

The speech recognition processing system 900 may have one or more processors 920 which may include a dedicated accelerator 922 such as the Intel Atom, memory stores 924 which may or may not hold the token buffers 926 as well as static or dynamic vocabularies, and so forth mentioned herein, at least one speaker unit 928 to provide auditory responses to the input acoustic signals, one or more displays 930 to provide images 934 of text as a visual response to the acoustic signals, other end device(s) 932 to perform actions in response to the acoustic signal, and antenna 936. In one example implementation, the speech processing system 900 may have the display 930, at least one processor 920 communicatively coupled to the display, at least one memory 924 communicatively coupled to the processor and having a token buffer 926 by one example for storing the tokens as explained above. The antenna 936 may be provided for transmission of the best word sequence matched or the input acoustic signal or other relevant commands to other devices that may act upon such a determination. Otherwise, the results of the speech recognition process may be stored in memory 924. As illustrated, any of these components may be capable of communication with one another and/or communication with portions of logic modules 904 and/or audio capture device 902. Thus, processors 920 may be communicatively coupled to both the audio capture device 902 and the logic modules 904 for operating those components. By one approach, although speech processing system 900, as shown in FIG. 9, may include one particular set of blocks or actions associated with particular components or modules, these blocks or actions may be associated with different components or modules than the particular component or module illustrated here.

Figure 10:
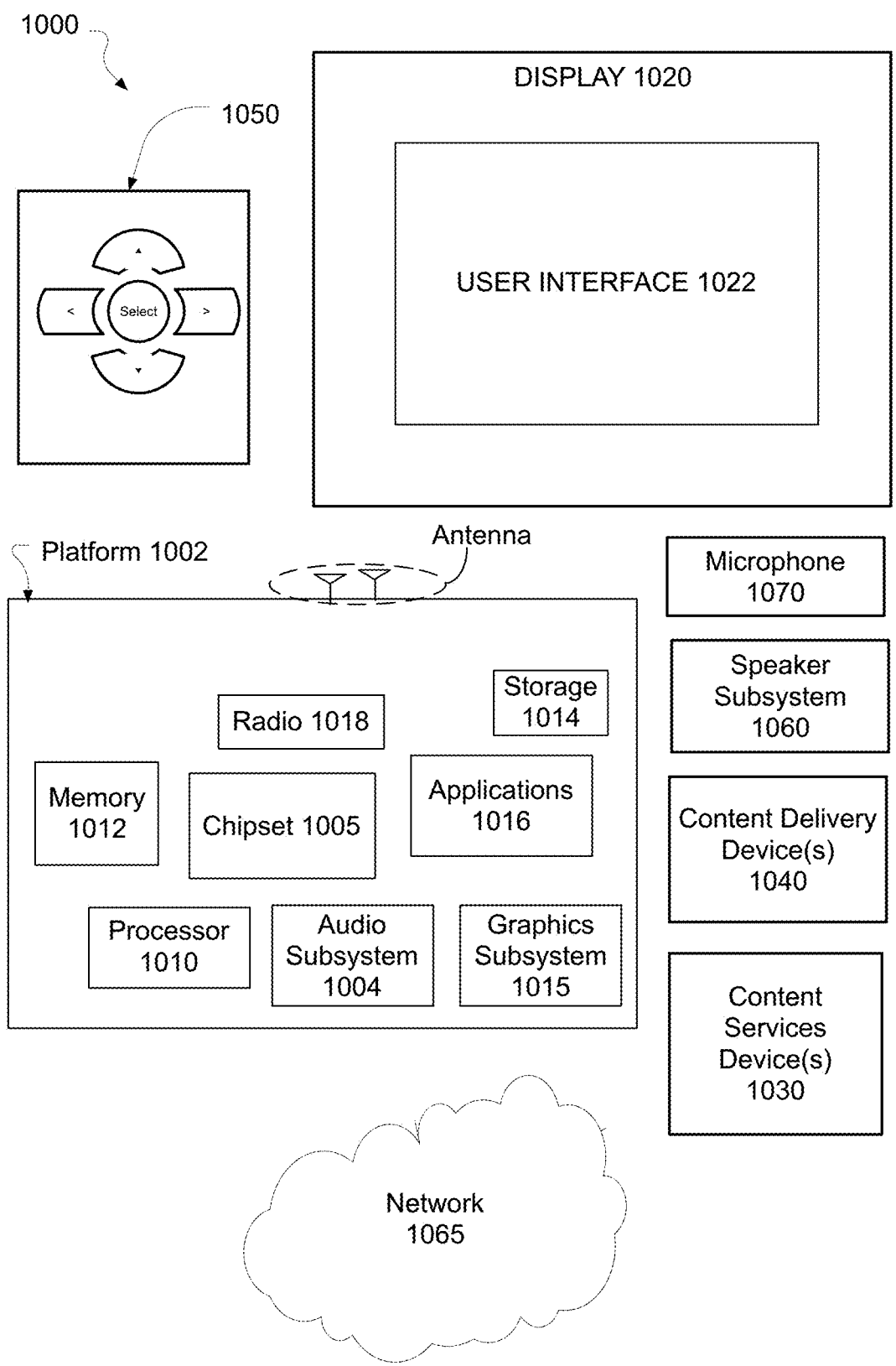
FIG. 10 is an illustrative diagram of another example system.

Referring to FIG. 10, an example system 1000 in accordance with the present disclosure operates one or more aspects of the speech processing system described herein. It will be understood from the nature of the system components described below that such components may be associated with, or used to operate, certain part or parts of the speech processing system described above. In various implementations, system 1000 may be a media system although system 1000 is not limited to this context. For example, system 1000 may be incorporated into a microphone, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (smart watch, smart glasses, exercise band), mobile internet device (MID), messaging device, data communication device, and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002, speaker 1070, microphone 1070, and/or display 1020. Each of these components is described in greater detail below.

In various implementations, platform 1002 may include any combination of a chipset 1005, processor 1010, memory 1012, storage 1014, audio subsystem 1004, graphics subsystem 1015, applications 1016 and/or radio 1018. Chipset 1005 may provide intercommunication among processor 1010, memory 1012, storage 1014, audio subsystem 1004, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Audio subsystem 1004 may perform processing of audio such as acoustic signals for speech recognition as described herein and/or voice recognition. The audio subsystem 1004 may comprise one or more processing units and accelerators. Such an audio subsystem may be integrated into processor 1010 or chipset 1005. In some implementations, the audio subsystem 1004 may be a stand-alone card communicatively coupled to chipset 1005. An interface may be used to communicatively couple the audio subsystem 1004 to a speaker 1060, microphone 1070, and/or display 1020.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1010 or chipset 1005. In some implementations, graphics subsystem 1015 may be a stand-alone card communicatively coupled to chipset 1005.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further implementations, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display, or any smartphone type display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020, speaker 1060, and microphone 1070. Platform 1002 and/or content services device(s) 1030 may be coupled to a network 1065 to communicate (e.g., send and/or receive) media information to and from network 1065. Content delivery device(s) 1040 also may be coupled to platform 1002, speaker 1060, microphone 1070, and/or to display 1020.

In various implementations, content services device(s) 1030 may include a microphone, a cable television box, personal computer, network, telephone, Internet enabled devices or appliance capable of delivering digital information and/or content, and any other similar device capable of unidirectionally or bidirectionally communicating content between content providers and platform 1002 and speaker subsystem 1060, microphone 1070, and/or display 1020, via network 1065 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In implementations, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1004 also may be used to control the motion of articles or selection of commands on the interface 1022.

Movements of the navigation features of controller 1050 may be replicated on a display (e.g., display 1020) by movements of a pointer, cursor, focus ring, or other visual indicators displayed on the display or by audio commands. For example, under the control of software applications 1016, the navigation features located on navigation controller 1050 may be mapped to virtual navigation features displayed on user interface 1022, for example. In implementations, controller 1050 may not be a separate component but may be integrated into platform 1002, speaker subsystem 1060, microphone 1070, and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example, or by auditory command. Program logic may allow platform 1002 to stream content to media adaptors or other content services device(s) 1030 or content delivery device(s) 1040 even when the platform is turned "off." In addition, chipset 1005 may include hardware and/or software support for 8.1 surround sound audio and/or high definition (7.1) surround sound audio, for example. Drivers may include an auditory or graphics driver for integrated auditory or graphics platforms. In implementations, the auditory or graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various implementations, platform 1002, speaker 1060, microphone 1070, and/or display 1020 may be an integrated unit. Display 1020, speaker 1060, and/or microphone 1070 and content service device(s) 1030 may be integrated, or display 1020, speaker 1060, and/or microphone 1070 and content delivery device(s) 1040 may be integrated, for example. These examples are not meant to limit the present disclosure.

In various implementations, system 1000 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the 110 adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
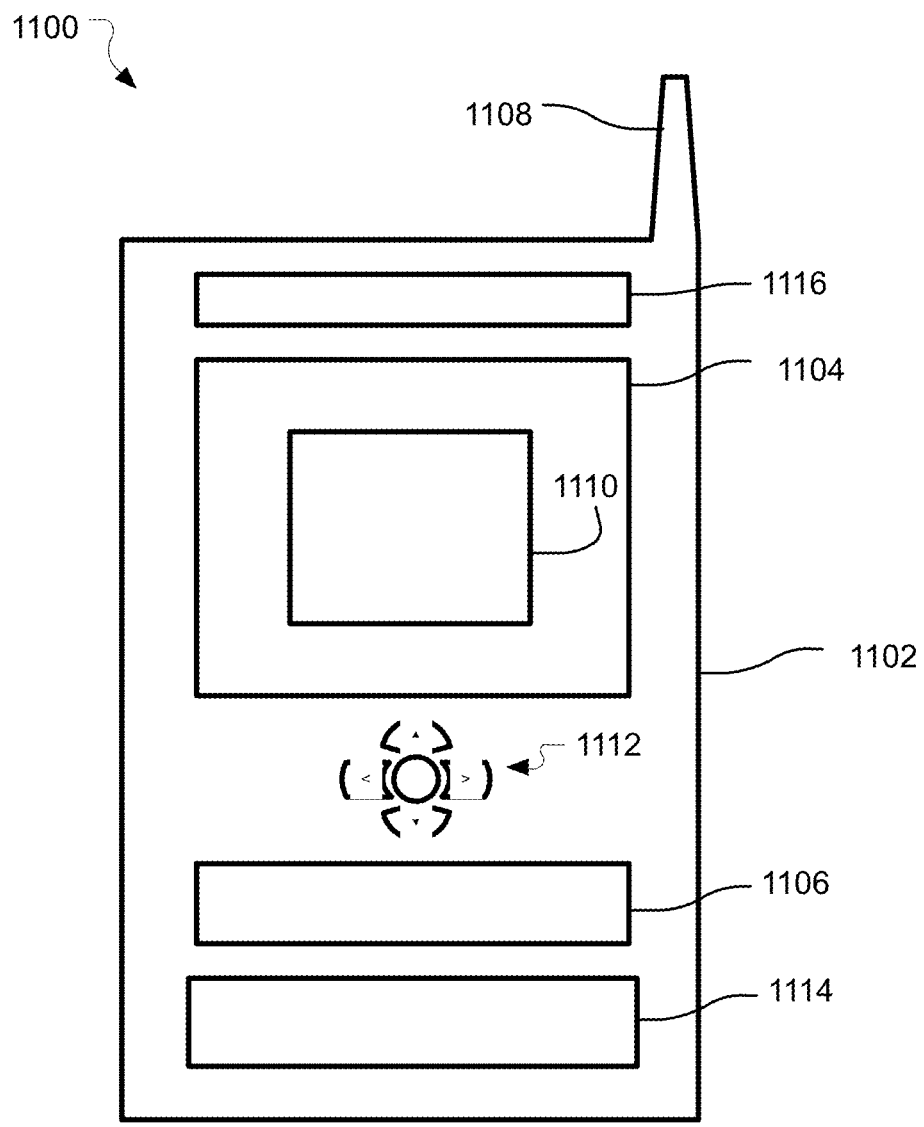
FIG. 11 illustrates another example device, all arranged in accordance with at least some implementations of the present disclosure.

Referring to FIG. 11, a small form factor device 1100 is one example of the varying physical styles or form factors in which system 1000 or 1100 may be embodied. By this approach, device 1100 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, and any other on-board (such as on a vehicle) computer that may accept audio commands.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 11, device 1000 may include a housing 1102, a display 1104 including a screen 1110, an input/output (I/O) device 1106, and an antenna 1108. Device 1100 also may include navigation features 1112. Display 1104 may include any suitable display unit for displaying information appropriate for a mobile computing device. 110 device 1106 may include any suitable 110 device for entering information into a mobile computing device. Examples for I/O device 1106 may include an alphanumeric keyboard, a numeric keypad, a touch pad, input keys, buttons, switches, rocker switches, software and so forth. Information also may be entered into device 1100 by way of microphone 1114. Such information may be digitized by a speech recognition device as described herein as well as a voice recognition devices and as part of the device 1100, and may provide audio responses via a speaker 1116 or visual responses via screen 1110. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of automatic speech recognition, comprising: generating a static vocabulary weighted finite state transducer (WFST) having nodes connected by arcs to propagate at least one token through the static vocabulary WFST and at least one dynamic vocabulary trigger marker at at least one of the arcs; propagating a token through at least one dynamic vocabulary WFST upon the at least one token reaching the trigger marker; propagating a token through at least one grammar WFST having at least one dynamic vocabulary class marker that indicates a type of dynamic vocabulary and is associated with the dynamic vocabulary of at least one of the dynamic vocabulary WFSTs with a propagating token; and providing a hypothetical word or phrase depending, at least in part, on the WFSTs and comprising terms in the static vocabulary, dynamic vocabulary, or both vocabularies.

By another implementation, the method also may comprise generating multiple dynamic vocabulary WFSTs each for a different class of dynamic vocabulary and when the at least one token reaches the dynamic vocabulary trigger marker; wherein a dynamic vocabulary WFST is formed for each dynamic vocabulary class that is available; wherein a dynamic vocabulary is a list of data provided for at least one of: name, email address, phone number, or a characteristic associated with contact information, audio or video description information, dining or entertainment data, geographical location information, and search engine search terms information. The method comprises matching at least one of the dynamic vocabulary WFSTs with a dynamic vocabulary class marker on the grammar WFST when a token is created in either an initial node or a final node of the dynamic vocabulary WFST, wherein a grammar WFST comprises a plurality of symbols each being a dynamic vocabulary class marker each formed for a single dynamic vocabulary WFST; and wherein dynamic vocabulary outputs from the dynamic WFST are not placed on the grammar WFST.

The method comprises forming a hypothetical word or phrase from the output of the static vocabulary WFST and words or phoneme from output of the at least one dynamic vocabulary WFST propagating a token to an end state, wherein a new token is created at the initial state of the lexicon-based WFST upon the dynamic vocabulary WFST forming the end state, and wherein the static vocabulary weighted finite state or the dynamic vocabulary weighted finite state transducer or both is a context-sensitive lexicon (CL)-type WFST and comprising cross-word arcs at at least one boundary between static vocabulary terms and dynamic vocabulary terms and providing alternative arcs of multiple possible phonetic or word context inputs or outputs, and wherein an alternative is provided for each possible phonetic or word contexts. The method also may include that wherein the dynamic vocabulary trigger marker of an arc on the static vocabulary WFST comprises a non-acoustic input label of the arc; wherein the grammar WFST has a non-acoustic symbol for each dynamic vocabulary class marker being used that may both the input and output symbol of an arc on the grammar WFST, and wherein the symbols do not appear on the static vocabulary WFST; and wherein at least one dynamic vocabulary first class is related to a sub-class of a second class, and wherein decoding a word in the first class causes use of a dynamic vocabulary WFST for the sub-class rather than the entire second class.

By yet another implementation, a computer-implemented system of speech recognition comprising: at least one acoustic signal receiving unit to obtain audio data including human speech; at least one processor communicatively connected to the acoustic signal receiving unit; at least one memory communicatively coupled to the at least one processor; and a WFST decoder operated by the at least one processor and to: generate a static vocabulary weighted finite state transducer (WFST) having nodes connected by arcs to propagate at least one token through the static vocabulary WFST and at least one dynamic vocabulary trigger marker at at least one of the arcs; propagate a token through at least one dynamic vocabulary WFST upon the at least one token reaching the trigger marker; propagate a token through at least one grammar WFST having at least one dynamic vocabulary class marker that indicates a type of dynamic vocabulary and is associated with the dynamic vocabulary of at least one of the dynamic vocabulary WFSTs with a propagating token; and provide a hypothetical word or phrase depending, at least in part, on the WFSTs and comprising terms in the static vocabulary, dynamic vocabulary, or both vocabularies.

By another example, the system provides that the WFST decoder is to generate multiple dynamic vocabulary WFSTs each for a different class of dynamic vocabulary and when the at least one token reaches the dynamic vocabulary trigger marker; wherein a dynamic vocabulary WFST is formed for each dynamic vocabulary class that is available; wherein a dynamic vocabulary is a list of data provided for at least one of: name, email address, phone number, or a characteristic associated with contact information, audio or video description information, dining or entertainment data, geographical location information, and search engine search terms information. The WFST decoder is to match at least one of the dynamic vocabulary WFSTs with a dynamic vocabulary class marker on the grammar WFST when a token is created in either an initial node or a final node of the dynamic vocabulary WFST, wherein a grammar WFST comprises a plurality of symbols each being a dynamic vocabulary class marker each formed for a single dynamic vocabulary WFST; and wherein dynamic vocabulary outputs from the dynamic WFST are not placed on the grammar WFST.

The WFST decoder is to form a hypothetical word or phrase from the output of the static vocabulary WFST and words or phoneme from output of the at least one dynamic vocabulary WFST propagating a token to an end state, wherein a new token is created at the initial state of the lexicon-based WFST upon the dynamic vocabulary WFST forming the end state, and wherein the static vocabulary weighted finite state or the dynamic vocabulary weighted finite state transducer or both is a context-sensitive lexicon (CL)-type WFST and comprising cross-word arcs at at least one boundary between static vocabulary terms and dynamic vocabulary terms and providing alternative arcs of multiple possible phonetic or word context inputs or outputs, wherein an alternative is provided for each possible phonetic or word contexts; wherein the dynamic vocabulary trigger marker of an arc on the static vocabulary WFST comprises a non-acoustic input label of the arc; wherein the grammar WFST has a non-acoustic symbol for each dynamic vocabulary class marker being used that may both the input and output symbol of an arc on the grammar WFST, and wherein the symbols do not appear on the static vocabulary WFST; and wherein at least one dynamic vocabulary first class is related to a sub-class of a second class, and wherein decoding a word in the first class causes use of a dynamic vocabulary WFST for the sub-class rather than the entire second class.

By one approach, at least one computer readable medium comprises a plurality of instructions that in response to being executed on a computing device, causes the computing device to: generate a static vocabulary weighted finite state transducer (WFST) having nodes connected by arcs to propagate at least one token through the static vocabulary WFST and at least one dynamic vocabulary trigger marker at at least one of the arcs; propagate a token through at least one dynamic vocabulary WFST upon the at least one token reaching the trigger marker; propagate a token through at least one grammar WFST having at least one dynamic vocabulary class marker that indicates a type of dynamic vocabulary and is associated with the dynamic vocabulary of at least one of the dynamic vocabulary WFSTs with a propagating token; and provide a hypothetical word or phrase depending, at least in part, on the WFSTs and comprising terms in the static vocabulary, dynamic vocabulary, or both vocabularies.

By another approach, the instructions cause the computing device to generate multiple dynamic vocabulary WFSTs each for a different class of dynamic vocabulary and when the at least one token reaches the dynamic vocabulary trigger marker; wherein a dynamic vocabulary WFST is formed for each dynamic vocabulary class that is available; and wherein a dynamic vocabulary is a list of data provided for at least one of: name, email address, phone number, or a characteristic associated with contact information, audio or video description information, dining or entertainment data, geographical location information, and search engine search terms information. The computing device is caused to match at least one of the dynamic vocabulary WFSTs with a dynamic vocabulary class marker on the grammar WFST when a token is created in either an initial node or a final node of the dynamic vocabulary WFST, wherein a grammar WFST comprises a plurality of symbols each being a dynamic vocabulary class marker each formed for a single dynamic vocabulary WFST; and wherein dynamic vocabulary outputs from the dynamic WFST are not placed on the grammar WFST.

The commuting device being caused to form a hypothetical word or phrase from the output of the static vocabulary WFST and words or phoneme from output of the at least one dynamic vocabulary WFST propagating a token to an end state, wherein a new token is created at the initial state of the lexicon-based WFST upon the dynamic vocabulary WFST forming the end state, and wherein the static vocabulary weighted finite state or the dynamic vocabulary weighted finite state transducer or both is a context-sensitive lexicon (CL)-type WFST and comprising cross-word arcs at at least one boundary between static vocabulary terms and dynamic vocabulary terms and providing alternative arcs of multiple possible phonetic or word context inputs or outputs, wherein an alternative is provided for each possible phonetic or word contexts; wherein the dynamic vocabulary trigger marker of an arc on the static vocabulary WFST comprises a non-acoustic input label of the arc; wherein the grammar WFST has a non-acoustic symbol for each dynamic vocabulary class marker being used that may both the input and output symbol of an arc on the grammar WFST, and wherein the symbols do not appear on the static vocabulary WFST; and wherein at least one dynamic vocabulary first class is related to a sub-class of a second class, and wherein decoding a word in the first class causes use of a dynamic vocabulary WFST for the sub-class rather than the entire second class.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of automatic speech recognition, comprising:
   obtaining, via at least one acoustic signal receiving unit, audio data including human speech;
   generating, via a decoder, a static vocabulary weighted finite state transducer (WFST) having nodes connected by arcs to propagate at least one token through the static vocabulary WFST and at least one dynamic vocabulary trigger marker at least one of the arcs;
   propagating, via the decoder, a token through at least one dynamic vocabulary WFST upon the at least one token reaching the trigger marker;
   propagating, via the decoder, a token through at least one grammar WFST having at least one dynamic vocabulary class marker that indicates a type of dynamic vocabulary and is associated with the dynamic vocabulary of at least one of the dynamic vocabulary WFSTs with a propagating token;
   providing, via the decoder, a hypothetical word or phrase based at least in part on the obtained human speech and depending, at least in part, on the WFSTs and comprising terms in the static vocabulary, dynamic vocabulary, or both vocabularies;
   determining, via an interpretation engine, user intent based at least in part on output from the decoder based at least in part on the hypothetical word or phrase; and
   initiating, via the interpretation engine, a response or action based at least in part on the determined user intent, the initiated response or action being implemented via speech output from a speaker component, via visual output from display component, and/or via other action from one or more end devices.

2. The method of claim 1 comprising generating multiple dynamic vocabulary WFSTs each for a different class of dynamic vocabulary and when the at least one token reaches the dynamic vocabulary trigger marker.

3. The method of claim 2 wherein a dynamic vocabulary WFST is formed for each dynamic vocabulary class that is available.

4. The method of claim 1 wherein a dynamic vocabulary is a list of data provided for at least one of:
   name, email address, phone number, or a characteristic associated with contact information,
   audio or video description information,
   dining or entertainment data,
   geographical location information, and
   search engine search terms information.

5. The method of claim 1 comprising matching at least one of the dynamic vocabulary WFSTs with a dynamic vocabulary class marker on the grammar WFST when a token is created in either an initial node or a final node of the dynamic vocabulary WFST.

6. The method of claim 5 wherein a grammar WFST comprises a plurality of symbols each being a dynamic vocabulary class marker each formed for a single dynamic vocabulary WFST.

7. The method of claim 1 wherein dynamic vocabulary outputs from the dynamic WFST are not placed on the grammar WFST.

8. The method of claim 1 comprising forming a hypothetical word or phrase from the output of the static vocabulary WFST and words or phoneme from output of the at least one dynamic vocabulary WFST propagating a token to an end state.

9. The method of claim 8 wherein a new token is created at the initial state of the lexicon-based WFST upon the dynamic vocabulary WFST forming the end state.

10. The method of claim 8 wherein the static vocabulary weighted finite state or the dynamic vocabulary weighted finite state transducer or both is a context-sensitive lexicon (CL)-type WFST and comprising cross-word arcs at at least one boundary between static vocabulary terms and dynamic vocabulary terms and providing alternative arcs of multiple possible phonetic or word context inputs or outputs.

11. The method of claim 10 wherein an alternative is provided for each possible phonetic or word contexts.

12. The method of claim 1 wherein the dynamic vocabulary trigger marker of an arc on the static vocabulary WFST comprises a non-acoustic input label of the arc.

13. The method of claim 1 wherein the grammar WFST has a non-acoustic symbol for each dynamic vocabulary class marker being used that may both the input and output symbol of an arc on the grammar WFST, and wherein the symbols do not appear on the static vocabulary WFST.

14. The method of claim 1 wherein at least one dynamic vocabulary first class is related to a sub-class of a second class, and wherein decoding a word in the first class causes use of a dynamic vocabulary WFST for the sub-class rather than the entire second class.

15. The method of claim 1 comprising generating multiple dynamic vocabulary WFSTs each for a different class of dynamic vocabulary and when the at least one token reaches the dynamic vocabulary trigger marker;
   wherein a dynamic vocabulary WFST is formed for each dynamic vocabulary class that is available;
   wherein a dynamic vocabulary is a list of data provided for at least one of:
      name, email address, phone number, or a characteristic associated with contact information,
      audio or video description information,
      dining or entertainment data,
      geographical location information, and
      search engine search terms information;
   the method comprising matching at least one of the dynamic vocabulary WFSTs with a dynamic vocabulary class marker on the grammar WFST when a token is created in either an initial node or a final node of the dynamic vocabulary WFST, wherein a grammar WFST comprises a plurality of symbols each being a dynamic vocabulary class marker each formed for a single dynamic vocabulary WFST;
   wherein dynamic vocabulary outputs from the dynamic WFST are not placed on the grammar WFST;
   the method comprising forming a hypothetical word or phrase from the output of the static vocabulary WFST and words or phoneme from output of the at least one dynamic vocabulary WFST propagating a token to an end state, wherein a new token is created at the initial state of the lexicon-based WFST upon the dynamic vocabulary WFST forming the end state, and wherein the static vocabulary weighted finite state or the dynamic vocabulary weighted finite state transducer or both is a context-sensitive lexicon (CL)-type WFST and comprising cross-word arcs at at least one boundary between static vocabulary terms and dynamic vocabulary terms and providing alternative arcs of multiple possible phonetic or word context inputs or outputs, wherein an alternative is provided for each possible phonetic or word contexts;

wherein the dynamic vocabulary trigger marker of an arc on the static vocabulary WFST comprises a non-acoustic input label of the arc;

wherein the grammar WFST has a non-acoustic symbol for each dynamic vocabulary class marker being used that may both the input and output symbol of an arc on the grammar WFST, and wherein the symbols do not appear on the static vocabulary WFST; and wherein at least one dynamic vocabulary first class is related to a sub-class of a second class, and wherein decoding a word in the first class causes use of a dynamic vocabulary WFST for the sub-class rather than the entire second class.

16. A computer-implemented system of automatic speech recognition comprising:
- at least one acoustic signal receiving unit to obtain audio data including human speech;
- at least one processor communicatively connected to the acoustic signal receiving unit;
- at least one memory communicatively coupled to the at least one processor; and
- a WFST decoder operated by the at least one processor and to:
  - generate a static vocabulary weighted finite state transducer (WFST) having nodes connected by arcs to propagate at least one token through the static vocabulary WFST and at least one dynamic vocabulary trigger marker at at least one of the arcs;
  - propagate a token through at least one dynamic vocabulary WFST upon the at least one token reaching the trigger marker;
  - propagate a token through at least one grammar WFST having at least one dynamic vocabulary class marker that indicates a type of dynamic vocabulary and is associated with the dynamic vocabulary of at least one of the dynamic vocabulary WFSTs with a propagating token;
  - provide a hypothetical word or phrase based at least in part on the obtained human speech and depending, at least in part, on the WFSTs and comprising terms in the static vocabulary, dynamic vocabulary, or both vocabularies; and
- an interpretation engine to:
  - determine user intent based at least in part on output from the decoder based at least in part on the hypothetical word or phrase; and
  - initiate a response or action based at least in part on the determined user intent, the initiated response or action being implemented via speech output from a speaker component, via visual output from display component, and/or via other action from one or more end devices.

17. The system of claim 16, wherein the WFST decoder is to generate multiple dynamic vocabulary WFSTs each for a different class of dynamic vocabulary and when the at least one token reaches the dynamic vocabulary trigger marker.

18. The system of claim 17 wherein a dynamic vocabulary WFST is formed for each dynamic vocabulary class that is available.

19. The system of claim 16, wherein the WFST decoder is to match at least one of the dynamic vocabulary WFSTs with a dynamic vocabulary class marker on the grammar WFST when a token is created in either an initial node or a final node of the dynamic vocabulary WFST.

20. The system of claim 19 wherein a grammar WFST comprises a plurality of symbols each being a dynamic vocabulary class marker each formed for a single dynamic vocabulary WFST.

21. The system of claim 16 wherein dynamic vocabulary outputs from the dynamic WFST are not placed on the grammar WFST.

22. The system of claim 16 wherein the WFST decoder is to forming a hypothetical word or phrase from the output of the static vocabulary WFST and words or phoneme from the output of the at least one dynamic vocabulary WFST propagating a token to an end state.

23. The system of claim 18 wherein the WFST decoder is to generate multiple dynamic vocabulary WFSTs each for a different class of dynamic vocabulary and when the at least one token reaches the dynamic vocabulary trigger marker;
- wherein a dynamic vocabulary WFST is formed for each dynamic vocabulary class that is available;
- wherein a dynamic vocabulary is a list of data provided for at least one of:
  - name, email address, phone number, or a characteristic associated with contact information,
  - audio or video description information,
  - dining or entertainment data,
  - geographical location information, and
  - search engine search terms information;
- wherein the WFST decoder is to match at least one of the dynamic vocabulary WFSTs with a dynamic vocabulary class marker on the grammar WFST when a token is created in either an initial node or a final node of the dynamic vocabulary WFST, wherein a grammar WFST comprises a plurality of symbols each being a dynamic vocabulary class marker each formed for a single dynamic vocabulary WFST;
- wherein dynamic vocabulary outputs from the dynamic WFST are not placed on the grammar WFST;
- the WFST decoder to form a hypothetical word or phrase from the output of the static vocabulary WFST and words or phoneme from output of the at least one dynamic vocabulary WFST propagating a token to an end state, wherein a new token is created at the initial state of the lexicon-based WFST upon the dynamic vocabulary WFST forming the end state, and wherein the static vocabulary weighted finite state or the dynamic vocabulary weighted finite state transducer or both is a context-sensitive lexicon (CL)-type WFST and comprising cross-word arcs at at least one boundary between static vocabulary terms and dynamic vocabulary terms and providing alternative arcs of multiple possible phonetic or word context inputs or outputs, wherein an alternative is provided for each possible phonetic or word contexts;
- wherein the dynamic vocabulary trigger marker of an arc on the static vocabulary WFST comprises a non-acoustic input label of the arc;
- wherein the grammar WFST has a non-acoustic symbol for each dynamic vocabulary class marker being used that may both the input and output symbol of an arc on the grammar WFST, and wherein the symbols do not appear on the static vocabulary WFST; and wherein at least one dynamic vocabulary first class is related to a sub-class of a second class, and wherein decoding a word in the first class causes use of a dynamic vocabulary WFST for the sub-class rather than the entire second class.

24. At least one non-transitory computer readable medium comprising a plurality of instructions that in response to being executed on a computing device, causes the computing device perform automatic speech recognition, comprising:

obtain audio data including human speech;

generate, via a decoder, a static vocabulary weighted finite state transducer (WFST) having nodes connected by arcs to propagate at least one token through the static vocabulary WFST and at least one dynamic vocabulary trigger marker at at least one of the arcs;

propagate, via the decoder, a token through at least one dynamic vocabulary WFST upon the at least one token reaching the trigger marker;

propagate, via the decoder, a token through at least one grammar WFST having at least one dynamic vocabulary class marker that indicates a type of dynamic vocabulary and is associated with the dynamic vocabulary of at least one of the dynamic vocabulary WFSTs with a propagating token; and provide, via the decoder, a hypothetical word or phrase based at least in part on the obtained human speech and depending, at least in part, on the WFSTs and comprising terms in the static vocabulary, dynamic vocabulary, or both vocabularies;

determine, via an interpretation engine, user intent based at least in part on output from the decoder based at least in part on the hypothetical word or phrase; and initiate, via the interpretation engine, a response or action based at least in part on the determined user intent, the initiated response or action being implemented via speech output from a speaker component, via visual output from display component, and/or via other action from one or more end devices.

25. The medium of claim 24 wherein the computing device is caused to generate multiple dynamic vocabulary WFSTs each for a different class of dynamic vocabulary and when the at least one token reaches the dynamic vocabulary trigger marker;

wherein a dynamic vocabulary WFST is formed for each dynamic vocabulary class that is available;

wherein a dynamic vocabulary is a list of data provided for at least one of:

name, email address, phone number, or a characteristic associated with contact information,
audio or video description information,
dining or entertainment data,
geographical location information, and
search engine search terms information;

wherein the computing device is caused to match at least one of the dynamic vocabulary WFSTs with a dynamic vocabulary class marker on the grammar WFST when a token is created in either an initial node or a final node of the dynamic vocabulary WFST, wherein a grammar WFST comprises a plurality of symbols each being a dynamic vocabulary class marker each formed for a single dynamic vocabulary WFST;

wherein dynamic vocabulary outputs from the dynamic WFST are not placed on the grammar WFST;

the commuting device being caused to form a hypothetical word or phrase from the output of the static vocabulary WFST and words or phoneme from output of the at least one dynamic vocabulary WFST propagating a token to an end state, wherein a new token is created at the initial state of the lexicon-based WFST upon the dynamic vocabulary WFST forming the end state, and wherein the static vocabulary weighted finite state or the dynamic vocabulary weighted finite state transducer or both is a context-sensitive lexicon (CL)-type WFST and comprising cross-word arcs at at least one boundary between static vocabulary terms and dynamic vocabulary terms and providing alternative arcs of multiple possible phonetic or word context inputs or outputs, wherein an alternative is provided for each possible phonetic or word contexts;

wherein the dynamic vocabulary trigger marker of an arc on the static vocabulary WFST comprises a non-acoustic input label of the arc;

wherein the grammar WFST has a non-acoustic symbol for each dynamic vocabulary class marker being used that may both the input and output symbol of an arc on the grammar WFST, and wherein the symbols do not appear on the static vocabulary WFST; and wherein at least one dynamic vocabulary first class is related to a sub-class of a second class, and wherein decoding a word in the first class causes use of a dynamic vocabulary WFST for the sub-class rather than the entire second class.

\* \* \* \* \*